(12) United States Patent
Gaudiau et al.

(10) Patent No.: US 12,546,423 B2
(45) Date of Patent: Feb. 10, 2026

(54) CONNECTING DEVICE, IN PARTICULAR FOR PRODUCING A FLUID FLOW CIRCUIT

(71) Applicant: TRISTONE FLOWTECH SOLUTIONS (TFS), Carquefou (FR)

(72) Inventors: Ghislain Gaudiau, Ancenis (FR); Luc N'Kaoua, Nantes (FR)

(73) Assignee: TRISTONE FLOWTECH SOLUTIONS (TFS), Carquefou (FR)

( * ) Notice: Subject to any disclaimer, the term of this patent is extended or adjusted under 35 U.S.C. 154(b) by 371 days.

(21) Appl. No.: 17/638,170

(22) PCT Filed: Aug. 20, 2020

(86) PCT No.: PCT/FR2020/051491
§ 371 (c)(1),
(2) Date: Feb. 24, 2022

(87) PCT Pub. No.: WO2021/038162
PCT Pub. Date: Mar. 4, 2021

(65) Prior Publication Data
US 2022/0349507 A1    Nov. 3, 2022

(30) Foreign Application Priority Data
Aug. 27, 2019   (FR) ...................................... 19 09439

(51) Int. Cl.
*F16L 37/084*   (2006.01)
*F16L 37/088*   (2006.01)
(Continued)

(52) U.S. Cl.
CPC ....... *F16L 37/0841* (2013.01); *F16L 37/0885* (2019.08); *F16L 37/1225* (2013.01); *F16L 37/144* (2013.01); *F16L 2201/10* (2013.01)

(58) Field of Classification Search
CPC . F16L 37/0885; F16L 37/1225; F16L 37/142; F16L 37/144; F16L 2201/10; F16L 37/0841
See application file for complete search history.

(56) References Cited

U.S. PATENT DOCUMENTS 5,683,117 A * 11/1997 Corbett ............... F16L 37/0885
                                                  285/305
6,231,089 B1 * 5/2001 DeCler ............... F16L 37/0841
                                                  285/308
(Continued)

FOREIGN PATENT DOCUMENTS

FR         2891344 A1 *  3/2007  ............ F16L 37/088

OTHER PUBLICATIONS

International Search Report dated Nov. 17, 2020.
Search Report dated Apr. 15, 2020.

*Primary Examiner* — Zachary T Dragicevich
*Assistant Examiner* — Alexander T Rufrano
(74) *Attorney, Agent, or Firm* — IPSILON USA, LLP (57) ABSTRACT

Connecting device (1), comprising: •—a bush (2), •—an end piece (6) which can be inserted into the bush (2) and is provided with a collar (7), •—a locking device (8) comprising an annular lock (9) which is radially movable inside the bush (2) and a return member (10) for returning the lock (9) to a locked position for retaining the collar (7) of the end piece (6) beyond the lock (9), •—a visual locking indicator (11) which is radially movable between an extended position of the bush (2) and a retracted position and is provided with tabs (12) for returning to the extended position. When the collar (7) of the end piece (6) is inserted beyond the lock (9), the indicator (11), which has the shape of a ring (110), surrounds the collar (7) of the end piece (6) retaining the indicator (11) in the retracted position and the tabs (12) for (Continued)

returning the indicator (11) are axially offset from the ring (110) with respect to direction of insertion of the end piece (6) in the bush (2).

8 Claims, 10 Drawing Sheets (51) Int. Cl.
*F16L 37/12* (2006.01)
*F16L 37/14* (2006.01)

(56) References Cited

U.S. PATENT DOCUMENTS

| | | | | |
|---|---|---|---|---|
| 7,802,822 B2* | 9/2010 | Poder | ............... | F16L 37/0841 |
| | | | | 285/317 |
| 7,845,684 B2* | 12/2010 | Gaudin | ............... | F16L 37/0841 |
| | | | | 285/317 |
| 8,033,575 B2* | 10/2011 | Tsurumi | ............... | F16L 37/144 |
| | | | | 285/305 |
| 9,016,729 B2* | 4/2015 | Ishida | ............... | F16L 37/0841 |
| | | | | 285/308 |
| 10,151,413 B2* | 12/2018 | Blake | ............... | A61M 39/10 |
| 10,487,967 B2* | 11/2019 | Gibelin | ............... | F16L 37/0841 |
| 10,738,926 B2* | 8/2020 | Stieler | ............... | F16L 37/0841 |
| 10,816,121 B2* | 10/2020 | Kerin, Jr. | ............... | F16L 37/0885 |
| 11,320,075 B2* | 5/2022 | Zhou | ............... | F16L 37/1225 |
| 2009/0261582 A1 | 10/2009 | Gaudin | | |
| 2010/0127492 A1 | 5/2010 | Poder et al. | | |
| 2013/0307263 A1* | 11/2013 | Parks | ............... | F16L 37/144 |
| | | | | 285/319 |
| 2019/0003626 A1* | 1/2019 | Stieler | ............... | F16L 37/0841 |
| 2020/0191310 A1* | 6/2020 | Kim | ............... | F16L 37/12 |

* cited by examiner

CONNECTING DEVICE, IN PARTICULAR FOR PRODUCING A FLUID FLOW CIRCUIT

RELATED APPLICATION

This application is a National Phase of PCT/EP2020/051491 filed on Aug. 20, 2020, which claims the benefit of priority from French Patent Application No. 19 09439, filed on Aug. 27, 2019, the entirety of which are incorporated by reference.

FIELD OF THE INVENTION

The present invention relates to a coupling device, notably for creating a circuit for the circulation of fluid.

It relates in particular to a coupling device comprising:
a so-called female socket delimited by a body,
a so-called male tubular endpiece that can be inserted by axial movement into the socket and is equipped with a connecting flange,
a locking device comprising an annular lock mounted with the ability to move radially inside the socket and an elastic return member for returning the annular lock to a locked position in which the annular lock forms, inside the socket, an end stop for axially retaining the male endpiece in the state of the flange of said endpiece having been introduced beyond said annular lock, considered with respect to the direction of introduction of the endpiece into the socket,
a visual locking indicator placed axially behind the locking device in the direction of introduction of the endpiece into the socket and mounted with the ability to move radially between a protruding position in which it projects partially from the socket and a retracted position in which it is at least partially retracted into the socket, said visual locking indicator being in the retracted position when the endpiece is in the state of having been inserted into the socket into a position in which the flange of said endpiece extends beyond the annular lock, said visual locking indicator being equipped with at least one elastically deformable return tongue for returning the visual locking indicator to the protruding position and with at least one end-of-travel end stop for the visual locking indicator in the protruding position.

DESCRIPTION OF RELATED ART

Numerous coupling devices comprise a socket intended to be mounted fixedly on one end of a pipe and a rigid tubular endpiece intended to be introduced into the socket, this tubular endpiece comprising a peripheral projection also known as a flange near its free end. The coupling device is supplemented by a locking device premounted on the socket. This locking device, which is spring-loaded, is mounted with the ability to move radially as the flange of the endpiece moves past it, before returning to a position in which the locking device forms an axial end stop for keeping the flange of the endpiece in the state of the endpiece having been introduced into the socket. In general, after the flange of the endpiece has moved up to the locking device, the return of the locking device to its so-called locked position under the action of the spring of the locking device is accompanied by a characteristic noise, such as a "click", perceptible to the operator. However, this audible indication signaling correct connection is not necessarily perceived by the operator who may be working in a noisy environment. In order to overcome this problem, certain coupling devices additionally comprise, as illustrated by document EP1770321, a visual locking indicator allowing correct connection between the endpiece and the socket to be confirmed while overcoming the constraints of noise in the assembly environment. However, the solutions hitherto proposed are complex and/or bulky. Thus, document FR-2.919.372 describes a coupling device with a ring and a visual locking indicator. This visual indicator comprises locking tabs. The purpose of these tabs is to retain the backing ring against a tendency to slip downwards and they constitute attachments to the ring. This solution is complex.

OBJECTS AND SUMMARY

It is an object of the invention to propose a coupling device the design of which makes it possible to limit the bulkiness of the coupling device to make it easier to incorporate in a reduced space.

To that end, the subject of the invention is a coupling device comprising:
a so-called female socket delimited by a body,
a so-called male tubular endpiece that can be inserted by axial movement into the socket and is equipped with a connecting flange,
a locking device comprising an annular lock mounted with the ability to move radially inside the socket and an elastic return member for returning the annular lock to a locked position in which the annular lock forms, inside the socket, an end stop for axially retaining the male endpiece in the state of the flange of said endpiece having been introduced beyond said annular lock,
a visual locking indicator placed axially behind the locking device in the direction of introduction of the endpiece into the socket and mounted with the ability to move radially between a protruding position in which it projects partially from the socket and a retracted position in which it is at least partially retracted into the socket, said visual locking indicator being in the retracted position when the endpiece is in the state of having been inserted into the socket into a position in which the flange of said endpiece extends beyond the annular lock, said visual locking indicator being equipped with at least one elastically deformable return tongue for returning the visual locking indicator to the protruding position and with at least one end-of-travel end stop for the visual locking indicator in the protruding position, characterized in that, in the state of the flange of said endpiece having been introduced beyond the annular lock, the visual locking indicator, which has the form of a ring, is held in the retracted position by bearing contact of the flange of the male endpiece with the ring surrounding said flange, and in that the elastically deformable return tongue or tongues for returning the visual locking indicator to the protruding position are axially offset from the ring considered with respect to the direction of introduction of the endpiece into the socket. The design of the visual locking indicator and, in particular, the axial offsetting of the ring that constitutes said indicator with respect to the return tongues that return the indicator to the protruding position mean that the bulkiness of the indicator/tongues assembly on the outside of the socket in the protruding position can be reduced so that such a coupling device can more easily be assembled in a reduced space.

According to one embodiment of the invention, the elastically deformable return tongue or tongues for returning the visual locking indicator to the protruding position, which are produced as one piece with the ring that constitutes the visual locking indicator, are connected to said ring by a connecting bridge. The connecting bridge is a bridge referred to as axial when considered with respect to the direction of introduction of the endpiece into the socket. This bridge effectively runs substantially parallel to said direction, give or take ten degrees. This results in a lower bulkiness of the connection.

According to one embodiment of the invention, the connecting bridge and the elastically deformable return tongue or tongues for returning the visual locking indicator to the protruding position are, when the visual locking indicator is in the retracted position, positioned inside housings formed in the thickness of the body of the socket. Once again, this results in reduced bulkiness of the visual locking indicator and of the tongues.

According to one embodiment of the invention, the elastically deformable return tongues for returning the visual locking indicator to the protruding position are two in number and between them form an arc positioned facing a part of the ring that makes up the visual locking indicator, the connecting bridge connecting the tongues to the ring being positioned in the central part of the arc. This layout allows simplified embodiment. The arc formed by the tongues is generally positioned facing a part, namely a face of the ring that faces part of the body of the ring.

According to one embodiment of the invention, the ring that constitutes the visual locking indicator is at least partially contained in a plane, and the elastically deformable return tongue or tongues for returning the visual locking indicator to the protruding position extend in a plane parallel to the plane at least partially containing said ring. Once again, this design allows reduced bulkiness of the visual locking indicator and of the tongues.

According to one embodiment of the invention, the elastically deformable return tongue or tongues for returning the visual locking indicator to the protruding position are in bearing contact with the body of the socket against which body they bear.

According to one embodiment of the invention, the annular lock and the visual locking indicator, each mounted with the ability to move radially so that they move independently, are back to back and respectively provided, in the case of one of them, with at least one recessed part and, in the case of the other one, with at least one raised part, said parts being able to be nested one inside the other to guide a sliding movement of the annular lock and of the visual locking indicator during the course of their relative radial movement. This results in improved reliability of the movements.

According to one embodiment of the invention, the or each end-of-travel stop for the visual locking indicator in the protruding position is positioned, on the ring that constitutes the visual locking indicator, opposite to the part of the ring that is equipped with the elastically deformable return tongue or tongues for returning the visual locking indicator to the protruding position, the or each end-of-travel stop for the visual locking indicator being, in the active end-stop position that corresponds to the protruding position of the visual locking indicator, in bearing contact against the exterior surface of the body of the socket. Thus, the visual locking indicator is difficult to lose without this detracting from the ease of fitting or removing it.

According to one embodiment of the invention, the elastic return member for returning the annular lock to the locked position and the annular lock are produced as a single piece, and the elastic return member for returning the annular lock to the locked position adopts the form of two elastically deformable pads positioned around the annular lock to form an arc centrally connected to the external peripheral surface of the annular lock. This results in simple manufacture of the locking device.

According to one embodiment of the invention, the body of the socket delimits an axial bore to accept the tubular endpiece and has at least one through opening through which the annular lock is accessible, and the annular lock, mounted with the ability to move radially inside the socket, is, as it moves, mounted with the ability to move between the locked position in which it extends non-coaxially with respect to the axial bore of the body of the socket, and an unlocked position in which it extends in a position substantially coaxial with the axial bore of the body of the socket so that the flange of the tubular endpiece can pass through the annular lock. This arrangement allows the endpiece to be locked in the socket easily by clip fastening.

BRIEF DESCRIPTION OF THE DRAWINGS

The invention will be clearly understood from reading the following description of some exemplary embodiments, with reference to the attached drawings in which.

DETAILED DESCRIPTION

As mentioned hereinabove, the coupling device 1 comprises a female socket 2 delimited by a tubular body 3 the cross section of which is generally not constant from one end of the socket 2 to the other, as in the example depicted in which the tubular body 3 has a stepped bore the cross section of which decreases from one of the ends of the socket 2 to the opposite end of the socket 2, this opposite end of the socket 2 needing to be fixed to a pipe or to a tube, not depicted, generally by push-fitting.

The coupling device 1 further comprises a so-called male tubular endpiece 6 that can be partially inserted into the socket 2 via the opposite end of the socket to the one that is to be coupled to the tube or to a pipe. The portion of the socket 2 inside which the tubular endpiece 6 is inserted is a rectilinear portion, which is to say a portion without any bend, so as to allow the tubular endpiece 6 to be inserted by an axial movement.

The body 3 of the socket 2 therefore delimits an axial bore 5, which is to say a bore that does not have a bend, for accepting the endpiece 6. The tubular endpiece 6 takes the form of a tubular body open at each of its ends. This tubular endpiece 6 is equipped with a flange 7, which is to say an external circumferential projection which, in the state of the endpiece 6 having been introduced into the socket 2, comes to bear against a seal, such as an O ring, housed inside the socket 2 and held in position by an internal peripheral shoulder of the body 3 of the socket 2 in a way known per se.

The coupling device 1 further comprises a locking device 8 configured to prevent the tubular endpiece 6 from being extracted when it has been correctly introduced into the female socket 2. This locking device 8 comprises an annular lock 9 mounted with the ability to be moved radially inside the socket 2 and an elastic return member 10 for returning the annular lock 9 to a locked position in which the annular lock 9 forms, inside the socket 2, an end stop 91 for axially retaining the male endpiece 6 in the state of the flange 7 of said endpiece 6 having been introduced beyond said annular lock 9 considered with respect to the direction of introduction of the endpiece 6 into the socket 2.

The body 3 of the socket 2 has at least one through opening 4, in this particular instance two through openings 4 that face one another, which is to say are diametrically opposed, inside which the annular lock 9 slides as it moves radially.

In the examples depicted, the elastic return member 10 for returning the annular lock 9 to the locked position and the annular lock 9 are made as a single piece and the elastic return member 10 for returning the annular lock 9 to the locked position takes the form of two elastically deformable tabs 100 positioned around the annular lock 9 to form an arc centrally connected to the external peripheral surface of the annular lock 9.

The annular lock 9 here adopts the form of a ring which may be ovoid or circular or any other shape. The elastically deformable tabs 100 positioned around the annular lock 9 are coplanar with the annular lock 9. The ends of these elastically deformable tabs 100 bear against the body 3 of the socket 2, particularly against the external surface of said body 3 in order to apply a return force for returning the annular lock 9 to the locked position.

The annular lock 9 mounted with the ability to move radially inside the socket 2 is, as it moves, mounted with the ability to move between the locked position in which it extends so that is not coaxial with respect to the axial bore 5 of the body 3 of the socket 2 and an unlocked position in which it extends in a position substantially coaxial with the axial bore 5 of the body 3 of the socket 2 so that the flange 7 of the tubular endpiece 6 can pass through the annular lock 9.

What is meant by substantially axial is axial, give or take a few millimeters.

This radial movement is obtained by collaboration between the endpiece 6 and the annular lock 9, and in particular by bearing contact of the flange 7 of the endpiece 6 on the annular lock 9 as the endpiece 6 is being introduced into the socket 2.

For this purpose, the annular lock 9 that is intended to have part of the endpiece passed through it may be equipped on its periphery with a tapered bearing surface acting as a ramp to facilitate the centering of the annular lock 9 by the endpiece 6 against the action of the elastically deformable tabs 100.

Once the flange 7 of the tubular endpiece 6 is positioned in the socket beyond the annular lock 9 when considered with respect to the direction of the introduction of the endpiece 6 into the socket 2, the annular lock 9 is returned by the return member 10 to the locked position in which the annular lock 9 partially projects into the body 3 of the socket 2 to form, at said projecting part, the end stop 91 for axially holding the endpiece in the socket by bearing contact with the flange 7 of the endpiece 6 when a pulling force is applied on the endpiece in the direction of extracting the endpiece 6 from the socket 2.

Note that to facilitate the sliding radial movement of the annular lock 9 in the openings 4 of the socket 2, the annular lock 9 is equipped with studs 20 or teeth which are inserted in a notch 21 formed at an edge of the through openings 4 of the socket.

The nested interengagement of these features guides the sliding movement. Likewise, to prevent the locking device 8 from becoming lost, the annular lock 9 is equipped with one or more end-of-travel end stops 19 for stopping it in its locked position. The or each end-of-travel stop 19 for the annular lock 9 is positioned on the annular lock 9 opposite to the part of the annular lock 9 that is equipped with the elastically deformable return member 10 for returning the annular lock 9 to the locked position.

The or each end-of-travel stop 19 for the annular lock 9 is, in the active position corresponding to the locked position of the annular lock 9, in bearing contact against the external surface of the body 3 of the socket 2.

The passage of the annular lock 9 from the locked position to the unlocked position is therefore accompanied by the moving of the end-of-travel stops 19 away from the external peripheral surface of the body 3 of the socket 2. The application of pressure to the elastically deformable return member 10 for returning the lock to the locked position in the direction of pushing toward the inside of the socket 2 also allows the annular lock 9 to pass from the locked position to the unlocked position so that the endpiece 6 can be extracted from the socket 2.

In order to improve the coupling device 1, this coupling device 1 further comprises a visual locking indicator 11 borne by the socket 2. This visual locking indicator 11 allows correct positioning of the endpiece 6 inside the socket 2, and therefore locking of said endpiece 6 to be confirmed simply by looking at its relative position with respect to the socket. This visual locking indicator 11 is placed axially behind the locking device 8 in the direction of introduction of the endpiece 6 into the socket 2. This visual locking indicator 11 takes the form of a ring. This visual locking indicator 11 is mounted with the ability to move radially between a protruding position in which it partially projects from the socket 2 through at least one through opening formed in the body 3 of the socket 2, and a retracted position in which it is at least partially retracted into the socket 2 and in particular extends in the thickness of the body 3 of the socket 2.

In the examples depicted, the through openings of the body 3 of the socket 2 through which openings the ring 110 that constitutes the visual locking indicator 11 moves in order to pass from the retracted position to the protruding position or vice versa, are formed facing one another on the body 3 of the socket 2 and are respectively common with the openings 4 in the body 3 of the socket 2 for housing the annular lock 9. Thus, the annular lock 9 and the visual locking indicator 11, each mounted with the ability to move radially so that they move independently, are back to back and respectively provided, in the case of one of them 9, with at least one recessed part 17 and, in the case of the other one 11, with at least one raised part 18, said parts 17, 18 being able to be nested one inside the other to guide a sliding movement of the annular lock 9 and of the visual locking indicator 11 during the course of their relative radial movement.

In the examples depicted, these recessed 17 and raised 18 parts are formed respectively by a discontinuous radial slot formed on a face of the ring that constitutes the annular lock 9 and by two diametrically opposed studs formed on the ring 110 of the visual locking indicator 11 facing the annular lock 9.

Quite obviously, in a variant, distinct through openings could have been provided on the body 3 of the socket 2 for the radial movement of the locking device 8 and of the visual locking indicator 11 without departing from the scope of the invention.

The visual locking indicator 11 is equipped with at least one elastically deformable return tongue 12 for returning the visual locking indicator 11 to the protruding position, and with at least one end-of-travel stop 13 for stopping the visual locking indicator 11 in the protruding position. In the examples depicted, two elastically deformable return tongues 12 for returning the visual locking indicator 11 to the protruding position are provided. These tongues 12 are produced as a single piece with the ring 110 that constitutes the visual locking indicator 11 and are connected to the ring 110 by a connecting bridge 14.

This connecting bridge 14 and the elastically deformable return tongues 12 for returning the visual locking indicator 11 to the protruding position are, when the visual locking indicator 11 is in the retracted position, positioned inside housings, depicted as 15 and 16 in the figures, formed in the thickness of the body 3 of the socket 2. These housings 15 and 16 adjoin the housing accommodating the ring 110 that constitutes the visual locking indicator 11.

In the examples depicted, the elastically deformable return tongues 12 for returning the visual locking indicator 11 to the protruding position are two in number and between them form an arc positioned facing a part, in this instance facing the face, of the ring 110 that constitutes the visual locking indicator 11 and face to face with the body delimiting the ring 110. The connecting bridge 14 connecting the tongues 12 to the ring 110 is positioned in the central, which is to say median, part of the arc. The ring 110 that constitutes the visual locking indicator 11 is at least partially contained in a plane, and the elastically deformable return tongue or tongues 12 for returning the visual locking indicator 11 to the protruding position extend in a plane parallel to the plane at least partially containing said ring 110.

It should be noted that, in a variant, a single elastically deformable tongue could have been provided without departing from the scope of the invention.

Thus, in the state of the visual locking indicator 18 having been positioned on the socket 2, the elastic return tongues 12 for returning the visual locking indicator 11 to the protruding position are axially offset from the ring 110 considered with respect to the direction of introduction of the endpiece 6 into the socket. These elastically deformable return tongues 12 for returning the visual locking indicator 11 to the protruding position are in bearing contact with the body 3 of the socket 2 against which body they bear. This bearing contact is at the free ends of the tongues 12. Each end-of-travel stop 13 for the visual locking indicator 11 in the protruding position is positioned on the ring 110 that constitutes the visual locking indicator 11 opposite to the part of the ring 110 that is equipped with the elastically deformable return tongues 12 for returning the visual locking indicator 11 to the protruding position.

Each end-of-travel stop 13 for the visual locking indicator 11 is, when the end stops are in the active position corresponding to the protruding position of the visual locking indicator 11, in bearing contact against the exterior surface of the body 3 of the socket. Each end-of-travel stop 13 here adopts the form of a hook extending toward the outside of the ring 110 that constitutes the visual locking indicator 11 projecting from said ring 110. This hook is able to engage with an edge of the through opening 4 formed in the body 3 of the socket 2. Each end-of-travel stop 13 is produced here as a single piece with the ring that constitutes the visual locking indicator 11.

In practice, the visual locking indicator 11 is in a retracted position in the state of the endpiece 6 having been inserted into the socket 2 in a position in which the flange 7 of said endpiece 6 extends beyond the annular lock 9 considered with respect to the direction of introduction of the endpiece into the socket. Specifically, in the state of the flange 7 of the endpiece 6 having been introduced beyond the annular lock 9, the visual locking indicator 11 which adopts the form of a ring 110 surrounds the flange 7 of the endpiece.

This visual locking indicator 11 is thus held in the retracted position by bearing contact of the flange 7 of the male endpiece 6 with the ring 110 surrounding said flange 7. During its radial movement, the visual locking indicator 11 therefore passes, under the action of the endpiece 6 and in particular of the flange 7 of the endpiece 6, from a protruding position in which it extends in a position that is not coaxial with respect to the axial bore of the body 3 of the socket 2 to a retracted position in which it extends in a position substantially coaxial with the axial bore 5 of the body 3 of the socket 2 to house the flange 7 of the tubular endpiece 6 inside the ring 10 that constitutes the visual locking indicator 11 and hold the flange in this position.

What is meant by substantially coaxial is coaxial to within a few millimeters, namely generally to within less than 5 mm.

The ring 110 that constitutes the visual locking indicator 11 and the flange 7 of the endpiece 6 are thus in bearing contact over at least part of the exterior periphery of the flange 7 and at least part of the interior periphery of the ring 110 when the visual locking indicator 11 is in the retracted position with the ring 110 surrounding the flange.

As a preference, the ring 110 and the flange 7 of the endpiece 6 are substantially coaxial when the visual locking indicator 11 is in the retracted position.

In this retracted position of the visual locking indicator 11, the visual locking indicator 11 and the elastically deformable return tongue or tongues 12 for returning the visual locking indicator 11 to the protruding position are positioned inside the overall perimeter delimited by the socket, and in particular are housed in the socket, notably in the thickness of the body of the socket so as to be as unbulky as possible.

Figure 1:
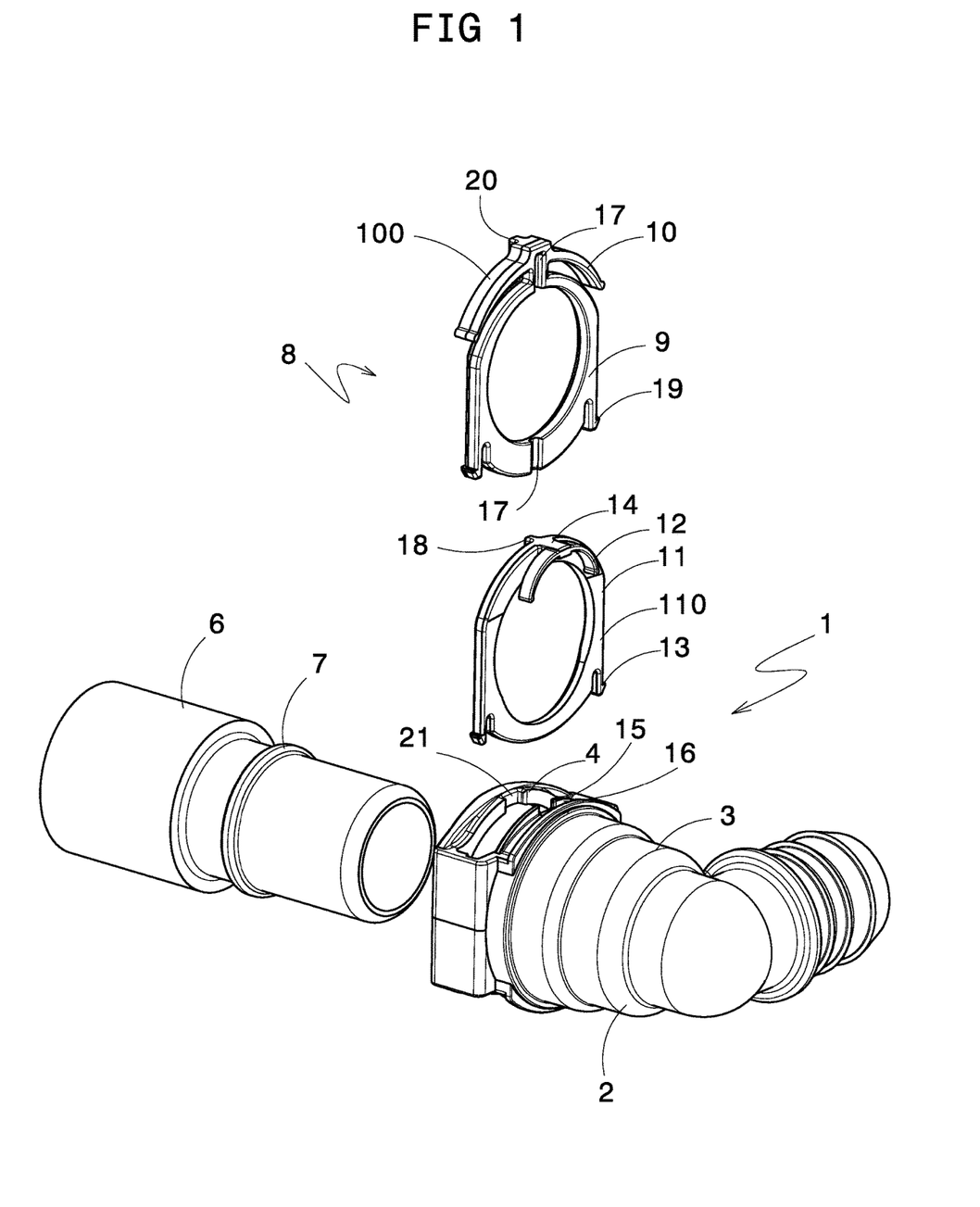
FIG. 1 depicts a perspective view of a coupling device according to the invention in the state of the locking device and of the visual locking indicator not having been fitted and in the state of the endpiece not having been introduced into the socket.
Figure 2:
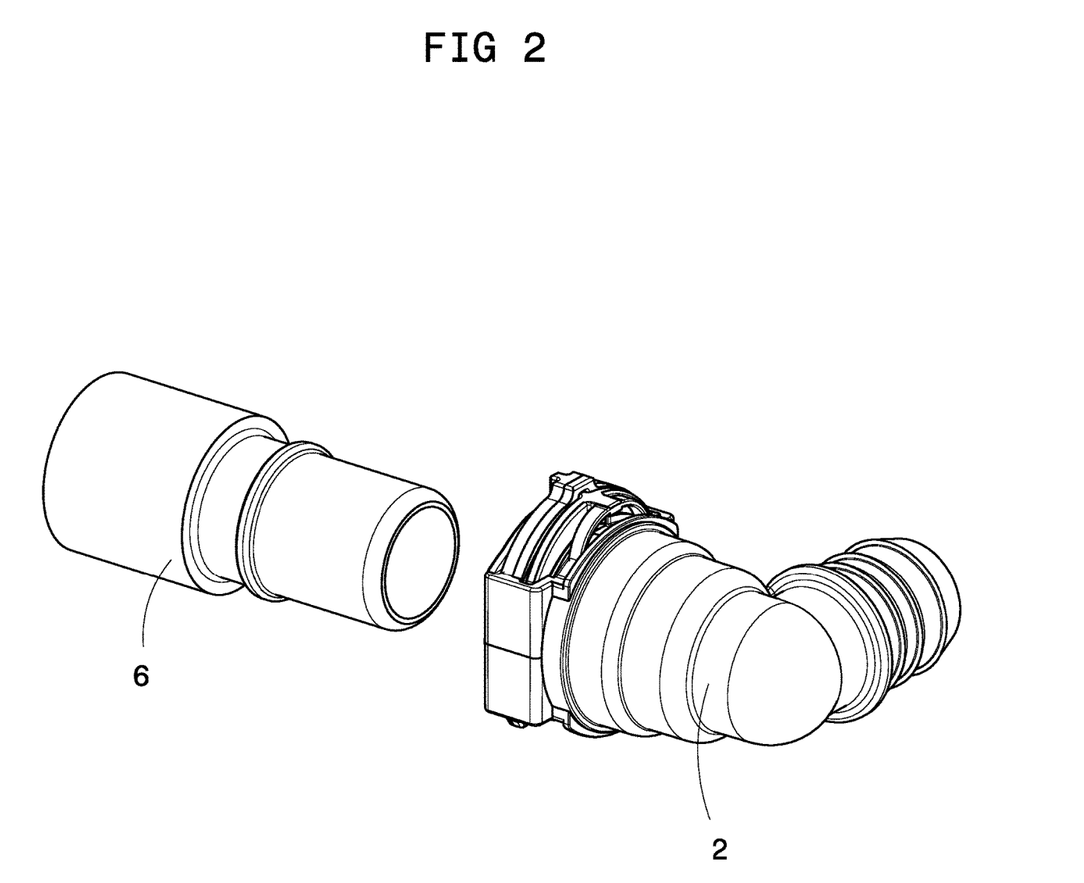
FIG. 2 depicts a perspective view of a coupling device according to the invention in the state of the locking device and of the visual locking indicator having been fitted to the socket and the state of the endpiece not having been introduced into the socket.
Figure 3:
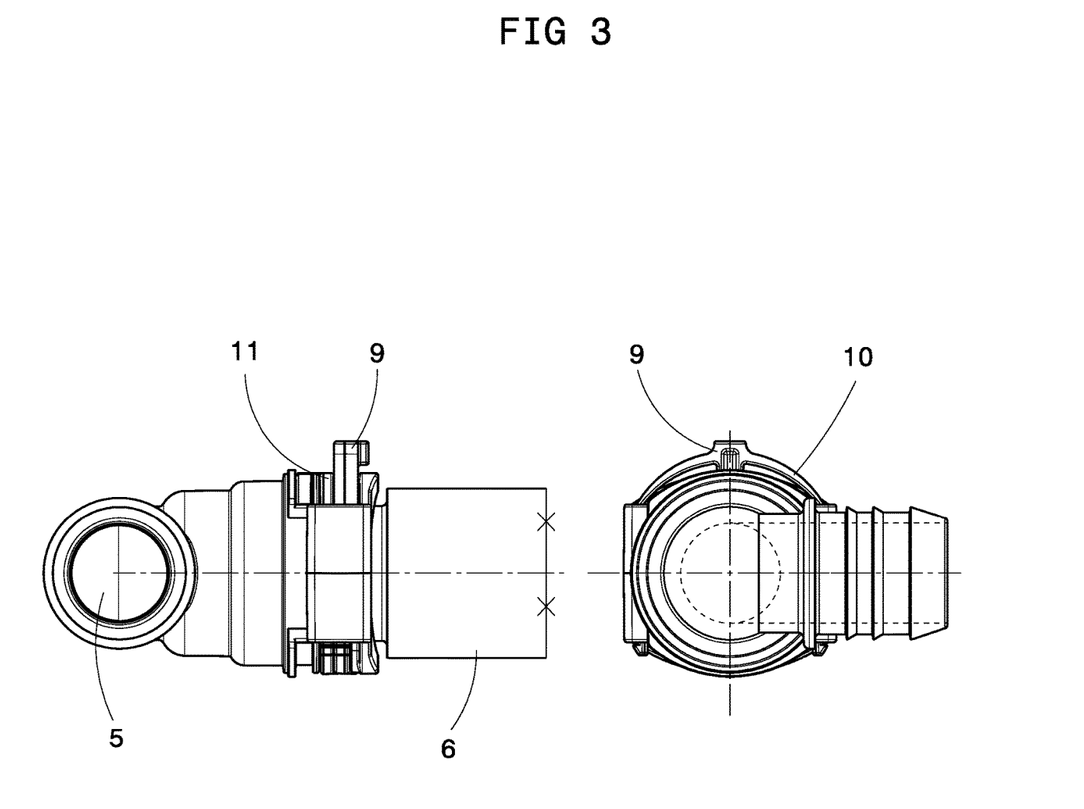
FIG. 3 depicts a perspective view and a face-on view of a coupling device according to the invention in the state of the locking device and the visual locking indicator having been fitted to the socket and in the state of the endpiece having been introduced into the socket.
Figure 4:
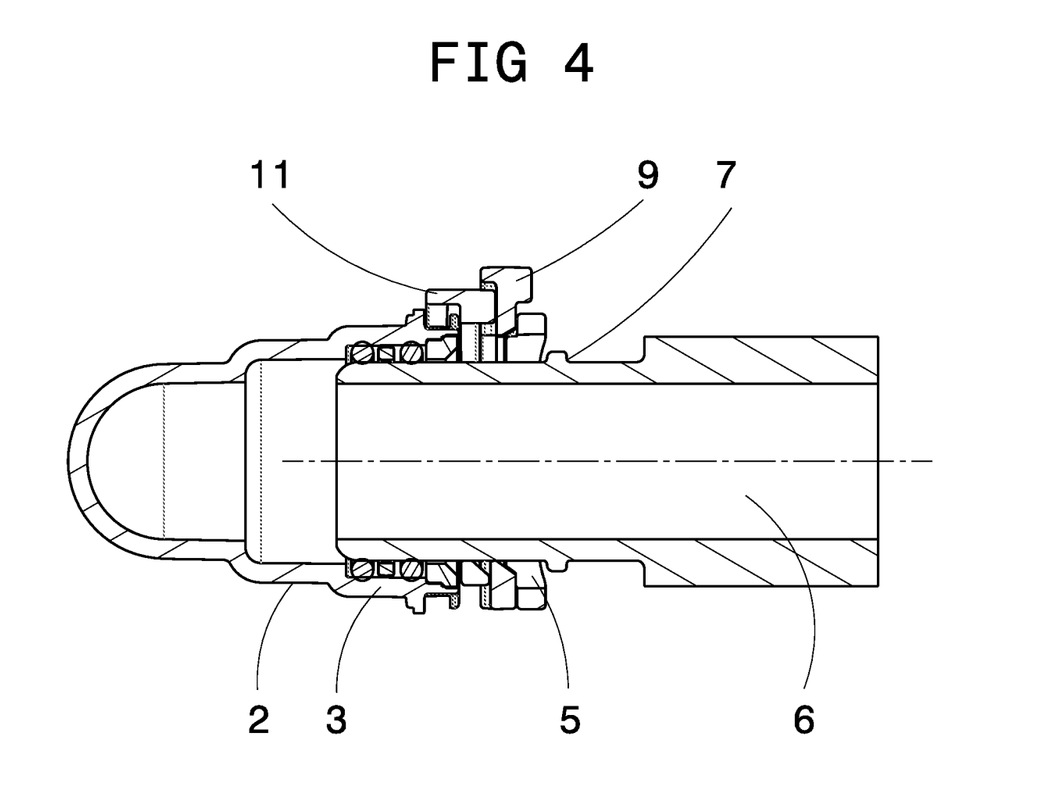
FIG. 4 depicts a view in section of the coupling device according to the invention during the process of the endpiece being introduced into the socket.
Figure 5:
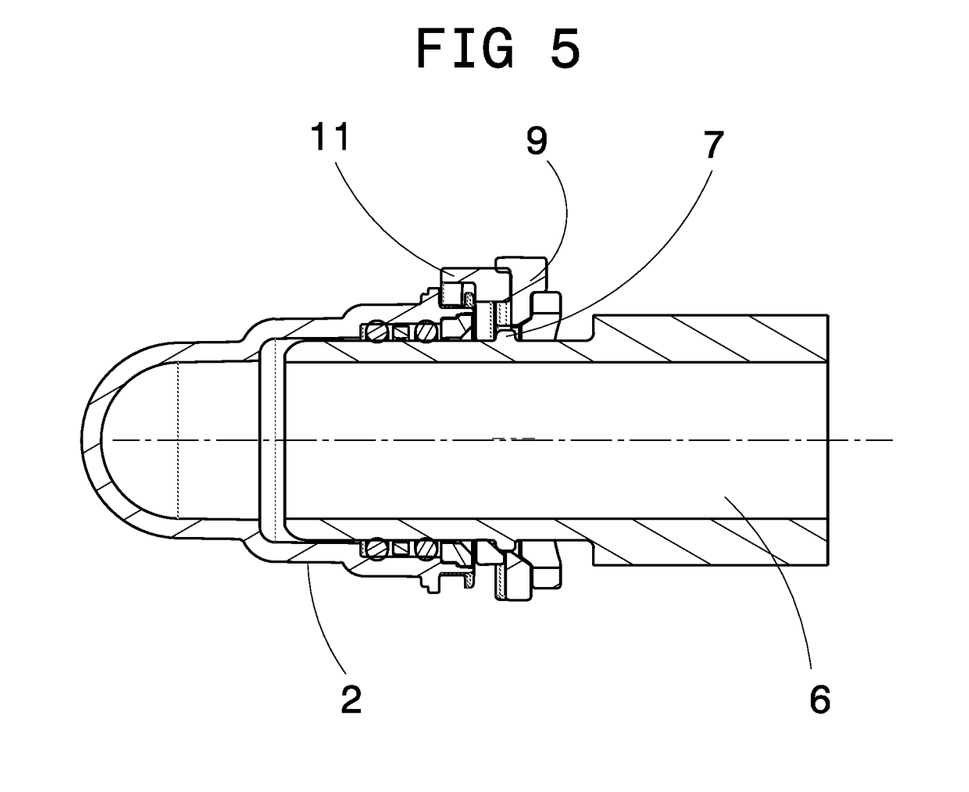
FIG. 5 depicts a view in section of a coupling device according to the invention during the process of the endpiece being introduced into the socket.
Figure 6:
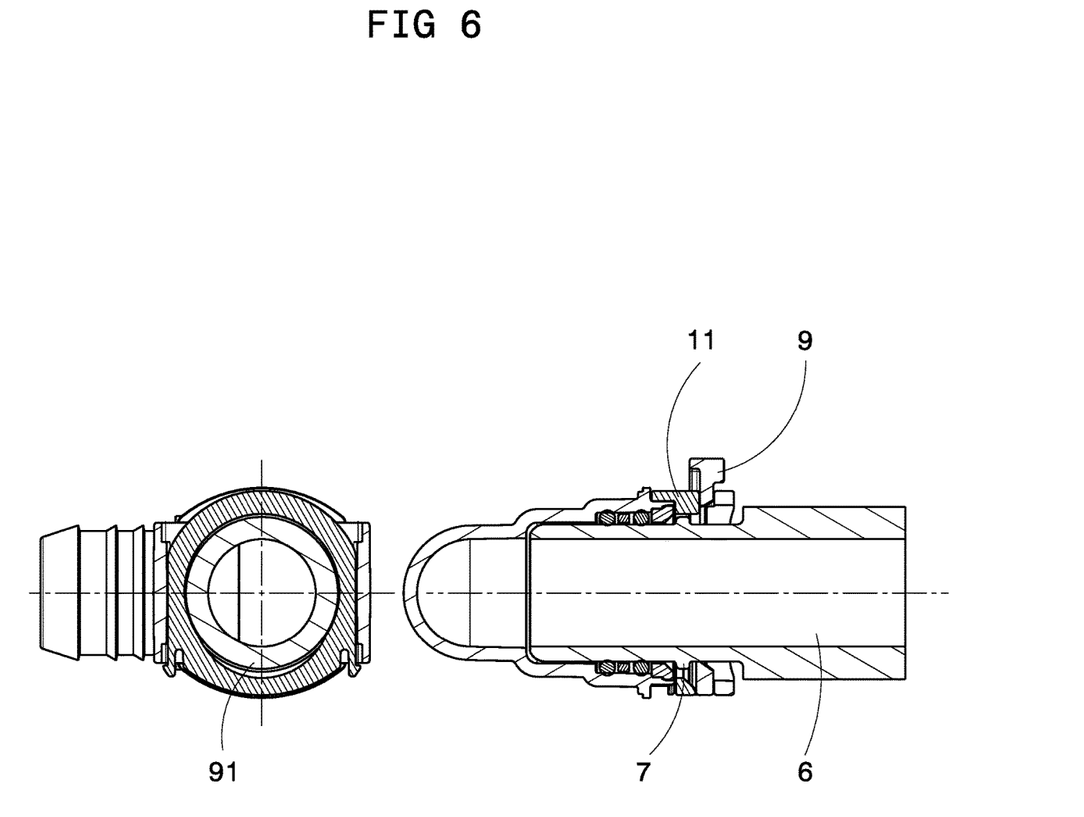
FIG. 6 depicts a view in section and a face-on view of a coupling device according to the invention at the end of the introduction of the endpiece into the socket.
Figure 7:
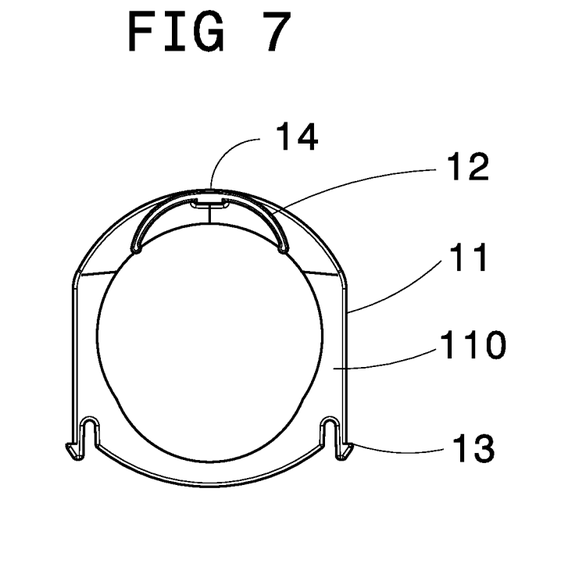
FIG. 7 depicts a face-on view of a visual locking indicator according to the invention viewed from the opposite face of the visual locking indicator to the one that faces toward the locking device.
Figure 8:
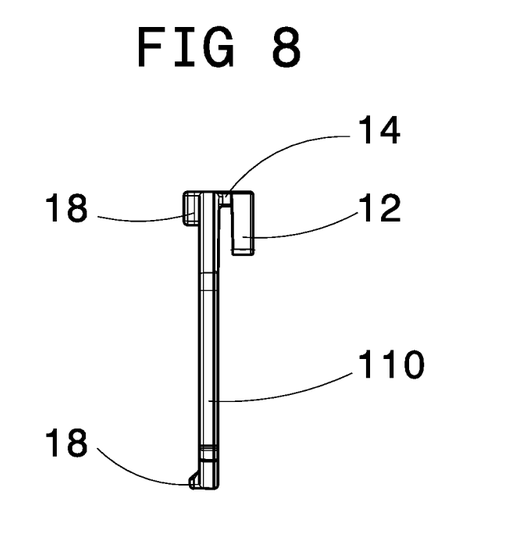
FIG. 8 depicts a side view of the visual locking indicator of FIG. 7.
Figure 9:
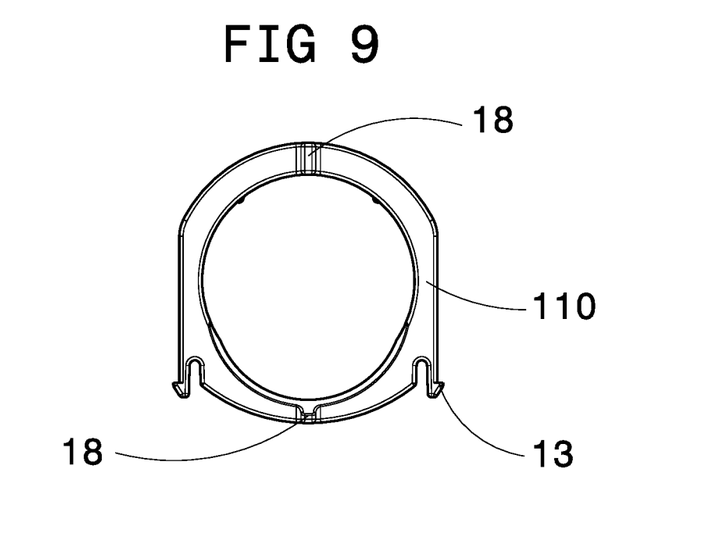
FIG. 9 depicts a rear view of the visual locking indicator of FIG. 7.
Figure 10:
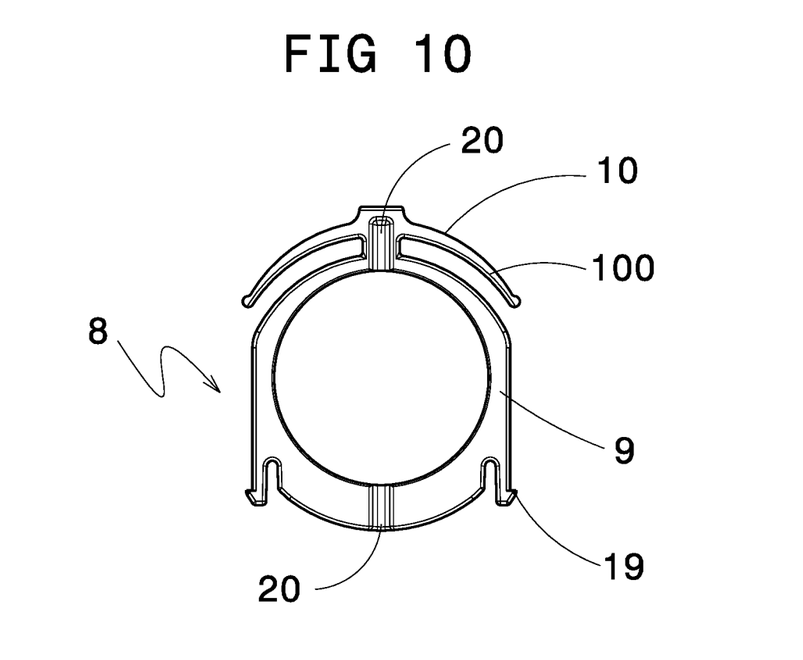
FIG. 10 depicts a face-on view of a locking device according to the invention viewed from the opposite face of the locking device to the one that faces toward the visual locking indicator.
Figure 11:
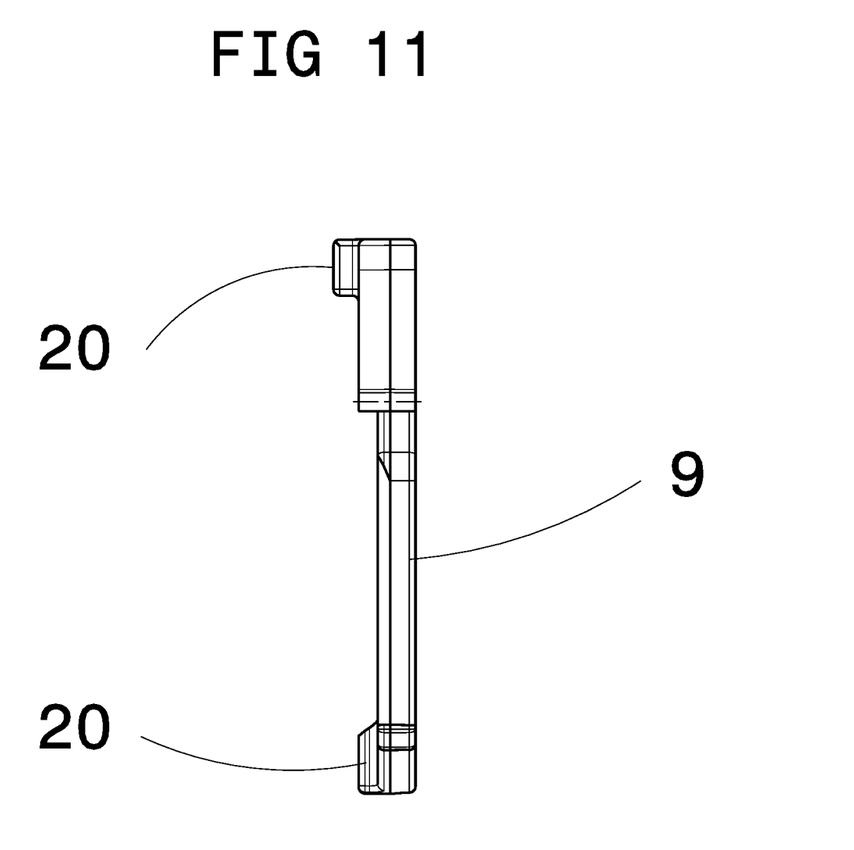
FIG. 11 depicts a side view of the locking device of FIG. 11.
Figure 12:
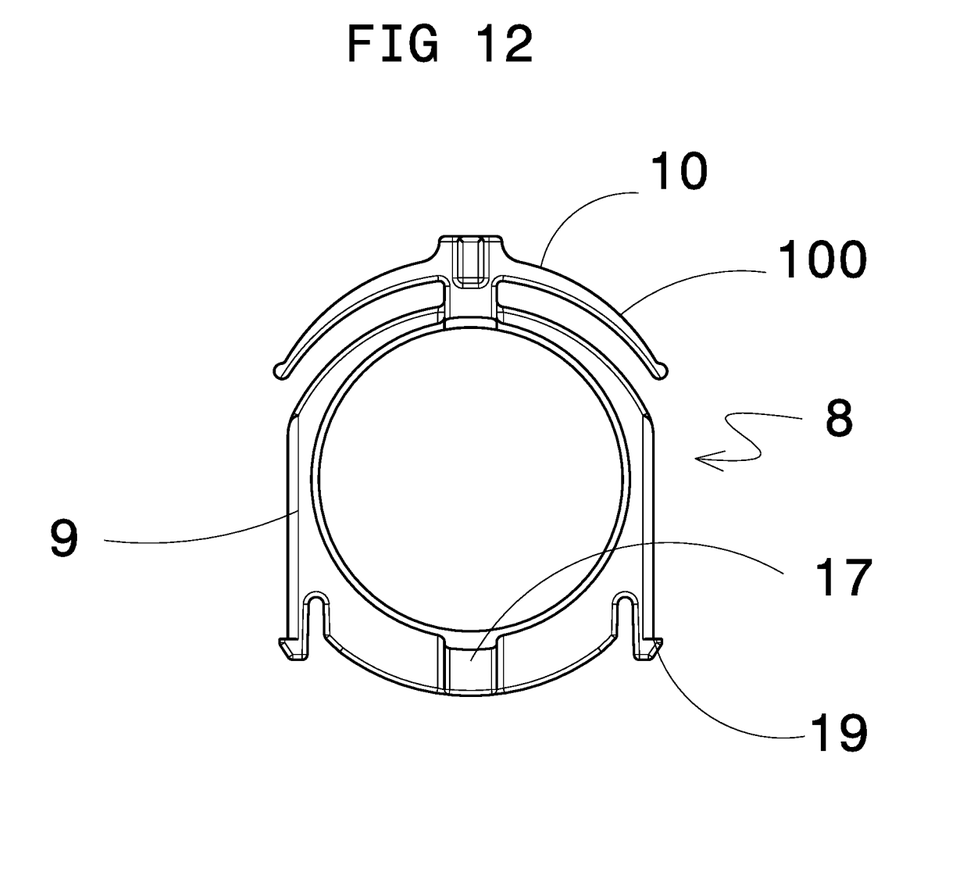
FIG. 12 depicts a rear view of the locking device of FIG. 10.

The introduction of the endpiece 6 into the socket 2 and its retention in the locked position in the socket 2 are achieved as illustrated in FIGS. 4 to 6.

The free end of the endpiece 6 is introduced into the socket 2 as far as a first position in which the flange 7 of the endpiece comes into bearing contact with the annular lock 9, particularly with the ramps of said annular lock 9. This bearing contact as the endpiece 6 continues to be introduced into the socket 2 causes the annular lock 9 to move radially against the action of the elastic return member 10 for returning the annular lock 9 to the locked position, which is to say a radial movement of the annular lock 9 in the direction of a centering of the annular lock 9 in the axial bore 5 of the socket 2.

The movement of introducing the endpiece 6 into the socket 2 is continued until the flange 7 of the endpiece 6 overcomes the annular lock 9. The latter can then, under the effect of the elastically deformable return member 10 for return to the locked position, return to an off-axis position with respect to the bore 5 of the body 3 of the socket 2 to form an end stop 91 for holding the endpiece 6 inside the socket 2.

In the position in which the flange 7 of the endpiece 6 has overcome the annular lock 9, this flange 7 is positioned inside the ring 110 of the visual locking indicator 11 as illustrated in FIG. 6.

This position corresponds to the end-of-travel position of the endpiece 6. In this position, the flange 7 surrounded by the ring 110 that constitutes the visual locking indicator 11 bears against the interior periphery of the ring 110 and forces it to retract into the socket 2 against the action of the elastically deformable return tongue or tongues 12 for returning the ring 110 to the protruding position.

In this retracted position of the visual locking indicator 11, the flange 7 of the endpiece 6 and the ring 110 that constitutes the visual locking indicator 11 are coplanar.

In this retracted position of the visual locking indicator 11 the elastically deformable return tongue or tongues 12 for returning the visual locking indicator 11 to the protruding position are likewise in a position retracted into the thickness of the body of the socket.

Thus, in the retracted position, the volume occupied by the visual locking indicator 11 around the socket may be extremely low if not zero.

The removal of the endpiece 6 is performed by radial pressure on the locking device 8 in the direction of the socket 2 against the action of the elastic return member 10 for returning the annular lock 9 to the locked position so as to center the annular lock 9 with respect to the bore 5 of the body 3 of the socket 2 and allow the endpiece 6 to be extracted from the socket 2 simply by pulling on the endpiece 6.

The endpiece 6 can thus be fitted and removed by simply moving the endpiece 6 axially.

The invention claimed is:

1. A coupling device comprising:
    a female socket delimited by a body,
    a male tubular endpiece that can be inserted by axial movement into the socket and is equipped with a connecting flange,
    a locking device comprising an annular lock mounted with the ability to move radially inside the socket and an elastic return member for returning the annular lock to a locked position in which the annular lock forms, inside the socket, an end stop for axially retaining the flange of the male endpiece having been introduced beyond said annular lock,
    a visual locking indicator placed axially behind the locking device in a direction of introduction of the endpiece into the socket and mounted with the ability to move radially between a protruding position in which the visual locking indicator projects partially from the socket and a retracted position in which the visual locking indicator is at least partially retracted into the socket, said visual locking indicator being in the retracted position when the endpiece is in the state of having been inserted into the socket into a position in which the flange of said endpiece extends beyond the annular lock, said visual locking indicator being equipped with at least one elastically deformable return tongue for returning the visual locking indicator to the protruding position and with at least one end-of-travel end stop for the visual locking indicator in the protruding position,
    wherein, in the state of the flange of said endpiece having been introduced beyond the annular lock, the visual locking indicator, which has the form of a ring is held in the retracted position by bearing contact of the flange of the male endpiece with the ring surrounding said flange, and in that the at least one elastically deformable return tongue for returning the visual locking indicator to the protruding position are entirely axially offset from the ring, said at least one elastically deformable return tongue connected to said ring by a connection bridge that extends away from the ring of the visual locking indicator, in a direction parallel to the direction of introduction of the endpiece into the socket,
    said at least one elastically deformable tongue is in the form of an arc curved facing towards the opening of the ring that makes up the visual locking indicator, the connecting bridge connecting the tongues to the ring being positioned in the central part of the arc,
    and in that the at least one end-of-travel stop is positioned, on the ring that constitutes the visual locking indicator, opposite to the part of the ring that is equipped with the elastically deformable return tongue or tongues for returning the visual locking indicator to the protruding position, the at least one end-of-travel stop is in bearing contact against the exterior surface of the body of the socket when the visual locking indicator is in an active end-stop position that corresponds to the protruding position of the visual looking indicator
    wherein the body of the socket delimits an axial bore to accept the tubular endpiece and has at least one through opening through which the annular lock is accessible, and in that, the annular lock, mounted with the ability to move radially inside the socket between the locked position in which the annular lock extends non-coaxially with respect to the axial bore of the body of the socket, and an unlocked position in which the annular lock extends in a position substantially coaxial with the axial bore of the body of the socket so that the flange of the tubular endpiece can pass through the annular lock.

2. The coupling device as claimed in claim 1, wherein the at least one elastically deformable return tongue for returning the visual locking indicator to the protruding position is produced as one piece with the ring that constitutes the visual locking indicator and the connecting bridge.

3. The coupling device as claimed in claim 2, wherein the connecting bridge and the at least one elastically deformable return tongue for returning the visual locking indicator to the protruding position are, when the visual locking indicator is in the retracted position, positioned inside housings formed in the thickness of the body of the socket.

4. The coupling device as claimed in claim 1, wherein the at least one elastically deformable return tongue for returning the visual locking indicator to the protruding position are two in number, said two return tongues both form the arc positioned facing towards the opening of the ring that makes up the visual locking indicator.

5. The coupling device as claimed in claim 1, wherein the ring that constitutes the visual locking indicator is at least partially contained in a plane, and in that the elastically deformable return tongue or tongues for returning the visual locking indicator to the protruding position extend in a plane parallel to the plane at least partially containing said ring.

6. The coupling device as claimed in claim 1, wherein the elastically deformable return tongue or tongues for returning the visual locking indicator to the protruding position are in bearing contact with the body of the socket.

7. The coupling device as claimed in claim 1, wherein the annular lock and the visual locking indicator, each mounted with the ability to move radially so that they move independently, are back-to-back and respectively provided, in the case of one of them, with at least one recessed part and, in the case of the other one, with at least one raised part, said parts being able to be nested one inside the other to guide a sliding movement of the annular lock and of the visual locking indicator during the course of their relative radial movement.

8. The coupling device as claimed in claim 1, wherein the elastic return member for returning the annular lock to the locked position and the annular lock are produced as a single piece, and in that, the elastic return member for returning the annular lock to the locked position adopts the form of two elastically deformable pads is positioned around the annular lock to form an arc centrally connected to the external peripheral surface of the annular lock.

* * * * *